April 7, 1953  E. R. COX  2,633,836
FUEL ECONOMIZING MEANS FOR INTERNAL-COMBUSTION ENGINES
Filed Aug. 18, 1950  3 Sheets-Sheet 2
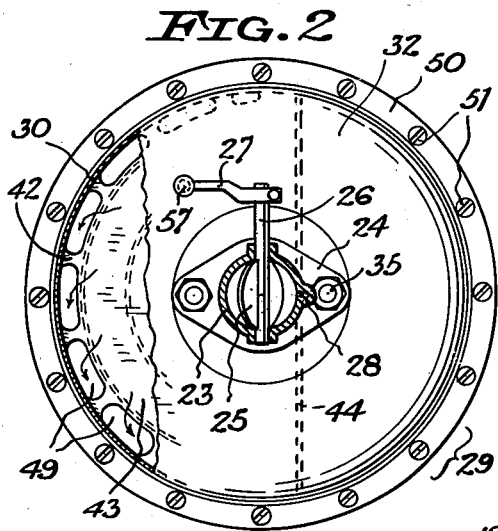
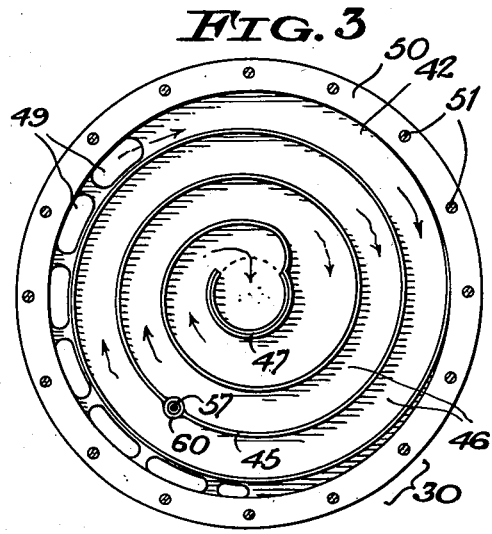
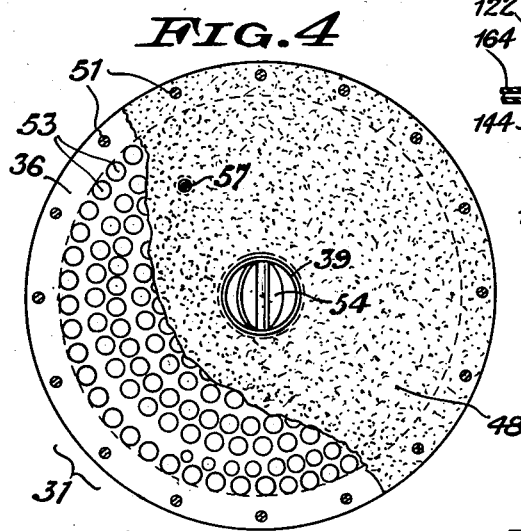
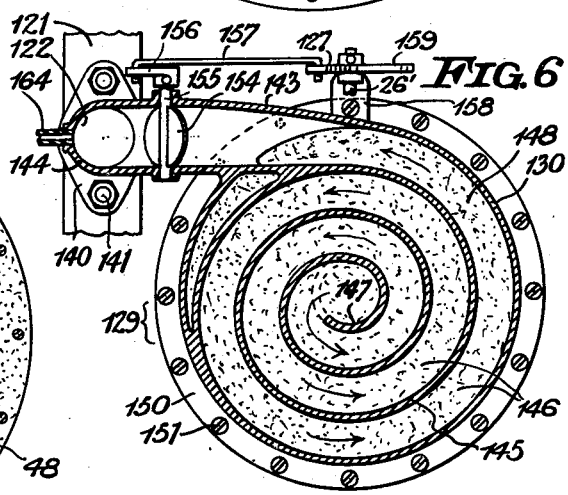
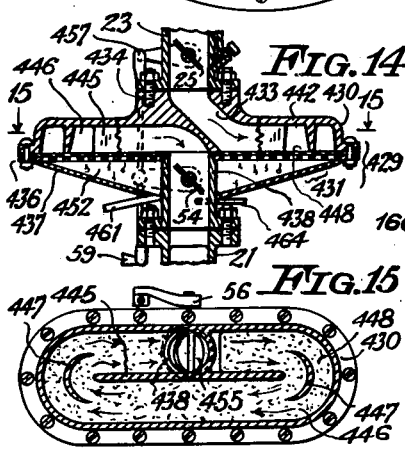
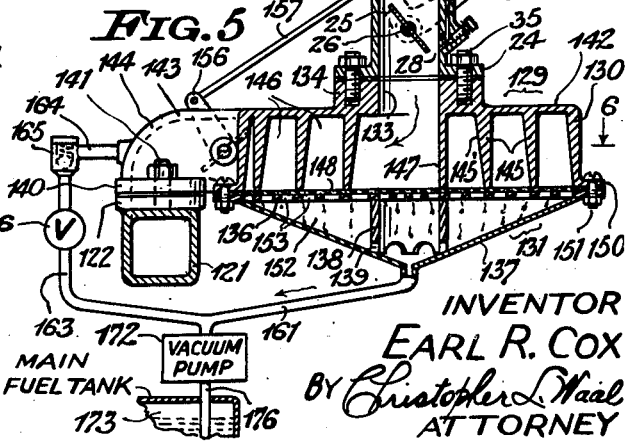
INVENTOR
EARL R. COX
BY Christopher L. Waal
ATTORNEY

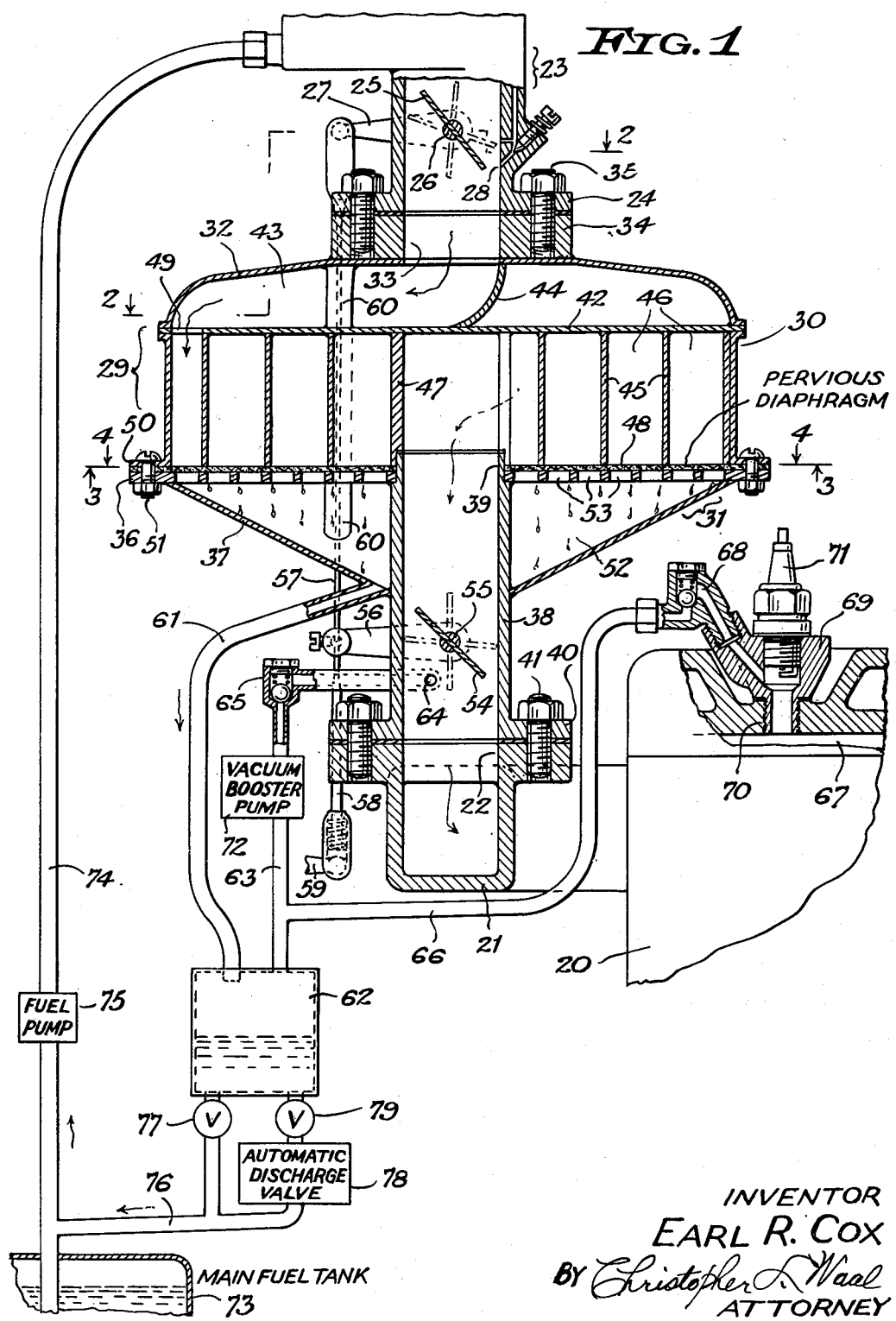

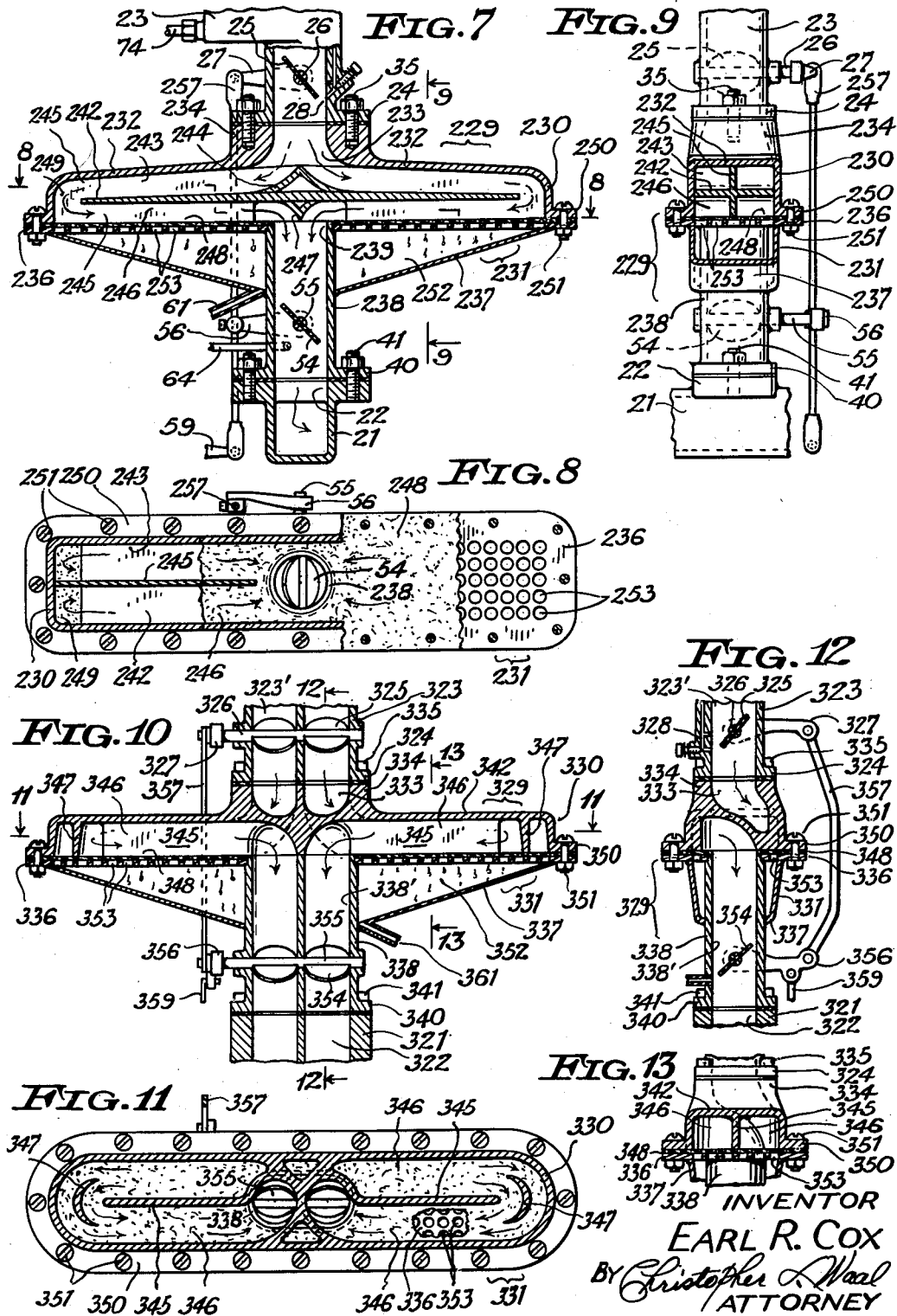

Patented Apr. 7, 1953

2,633,836

UNITED STATES PATENT OFFICE 2,633,836

FUEL ECONOMIZING MEANS FOR INTERNAL-COMBUSTION ENGINES

Earl R. Cox, Milwaukee, Wis.

Application August 18, 1950, Serial No. 180,125

8 Claims. (Cl. 123—119)

1

The present invention relates to internal combustion engines of the carbureting type, and more particularly to fuel economizing means for such engines.

A conventional internal combustion engine of the carbureting type includes an induction system into which liquid fuel is introduced, as by spraying, to form a combustible mixture of fuel vapor and air which is supplied to the intake manifold. In practice, it is found that a considerable portion of the introduced fuel will remain in unvaporized or liquid form, and this undesirable condition is especially prevalent during the starting operation and also during idling and normal operation in the case of an engine, such as an automotive engine, subject to variations in speed and load. It has been proposed to drain accumulated liquid fuel from an intake manifold, but a substantial amount of fuel will still remain entrained in liquid form in the flowing fuel mixture.

An object of the invention is to provide a novel fuel economizer for a carbureting type engine which will minimize the amount of unvaporized or liquid fuel in the fuel mixture supplied to the engine, and which will improve engine performance and substantially reduce carbon formation and crank case dilution.

Another object is to provide a fuel economizer which will separate and remove a large part of entrained liquid fuel from the flowing fuel mixture, and promote vaporization of the remaining entrained liquid fuel.

Still another object is to provide a fuel economizer which is so arranged as to act on the fuel mixture before it reaches the intake manifold of the engine.

A further object is to provide a fuel economizer which can be easily applied to existing engines, and which can be manufactured at relatively low cost.

A still further object is to provide a fuel economizer which will render carburetor adjustments less critical.

The invention further consists in the several features hereinafter described and claimed.

In the accompanying drawings, illustrating certain embodiments of the invention, Fig. 1 is a vertical sectional view of a fuel economizer of the invention applied to the induction system of an engine, parts of associated apparatus being shown schematically;

Fig. 2 is a sectional view taken generally on the line 2—2 of Fig. 1;

Fig. 3 is a sectional view taken generally on the line 3—3 of Fig. 1;

2

Fig. 4 is a sectional view taken generally on the line 4—4 of Fig. 1;

Fig. 5 is a vertical sectional view of a modified form of fuel economizer, parts being shown schematically;

Fig. 6 is a sectional view taken generally on the line 6—6 of Fig. 5;

Fig. 7 is a vertical sectional view of another modified form of fuel economizer;

Fig. 8 is a sectional view taken generally on the line 8—8 of Fig. 7;

Fig. 9 is a sectional view taken generally on the line 9—9 of Fig. 7;

Fig. 10 is a vertical sectional view of a further modified form of fuel economizer applied to an engine with a dual carburetor;

Fig. 11 is a sectional view taken generally on the line 11—11 of Fig. 10;

Fig. 12 is a sectional view taken generally on the line 12—12 of Fig. 10;

Fig. 13 is a sectional view taken generally on the line 13—13 of Fig. 10;

Fig. 14 is a vertical sectional view of still another modified form of fuel economizer, and Fig. 15 is a sectional view taken generally on the line 15—15 of Fig. 14.

Referring to Figs. 1 to 5 of the drawings, 20 designates a conventional internal combustion engine of the carbureting type having the usual intake manifold 21 with a top inlet connection 22. The engine is equipped with a conventional carburetor 23 here shown to be of the downdraft type and having a bottom outlet flange 24 and a throttle valve 25, the valve being carried on a rockably mounted shaft 26 to which an actuating lever 27 is secured. The carburetor is provided with the usual fuel jets among which are one or more idling jets 28.

The form of fuel economizer shown in Figs. 1 to 4 includes an economizer unit 29 which is interposed between the intake manifold inlet and the carburetor outlet, so as to facilitate application of the device to existing engines, such as automobile engines. In an installation of this type the carburetor is removed from the intake manifold and is remounted on the economizer unit.

The economizer unit comprises complementary upper and lower metal casing members 30 and 31, the adjacent marginal portions of which are rigidly secured together as hereinafter described. The upper casing member is of generally cylindrical shape and has a crowned head 32 with a central vertical opening 33 in a boss 34 to which the carburetor outlet flange 24 is rigidly secured, as by studs 35. The lower casing member 31 includes a perforated diaphragm-supporting top plate or disk 36 to which is secured a conical downwardly converging bottom wall or shell 37 and a central vertical outlet pipe 38 coaxial with the top boss 34, the outlet pipe having a reduced shouldered upper end 39 rigidly attached to and extending through the plate 36, and having a lower end with a flange 40 rigidly secured to the intake manifold inlet, as by studs 41. In this manner, the economizer unit and the carburetor are rigidly supported on the manifold.

A horizontal partition plate or disk 42 is secured in the upper casing member 30 below the head 32 to form therewith an inlet chamber 43. In some instances, a transversely extending curved deflector plate 44 forms a side of the entrance portion of the chamber 43. A spirally extending metal band or rib 45 with spaced convolutions has its upper edge secured to the bottom of the partition plate 42 so as to form therewith a spiral passage 46. The outer end of the band or rib terminates at the peripheral wall of the upper casing member, and the inner end terminates at a laterally opening tube 47 which is closed at its upper end by the partition plate 42 and which has an open lower end interfitting and communicating with the open upper end 39 of the vertical outlet pipe 38. The lower edge of the spiral band or rib extends in a horizontal plane and is close to or in contact with the upper surface of a porous or pervious diaphragm 48, hereinafter more fully described, which rests on the perforated plate 36. The diaphragm thus forms the bottom wall of the spiral passage 46. This passage is of generally rectangular cross-sectional shape elongated in a vertical direction, and the cross-sectional area of the passage is approximately the same as that of the carburetor outlet. The outer portion of the partition plate 42 has a series of openings or ports 49 extending about half way around the plate to form an inlet for the outer end of the spiral passage, the chamber 43 providing communication between the carburetor outlet and these ports. The upper casing member 30 has an outturned marginal bottom flange 50 which is rigidly attached to the marginal portion of the plate 36, as by screws 51, the marginal portion of the diaphragm being clamped between the casing flange 50 and the plate and being suitably sealed, as by shellac or other sealing material. The central portion of the diaphragm is apertured to fit about the upper end 39 of the outlet pipe 38, which rises slightly above the diaphragm.

An annular drain chamber 52 is formed between the conical bottom member 37 and the diaphragm-supporting plate 36, and the latter plate has perforations 53 arranged spirally, as seen in Fig. 4, to register with the spiral fuel passage 46. The drain chamber 52 is placed under a vacuum, as hereinafter described, for drawing liquid fuel downwardly through the diaphragm and discharging the liquid fuel from the chamber.

The diaphragm 36 is pervious to the liquid fuel, such as gasoline, which collects thereon, and is formed of a suitable dense but porous material such as tanned calfskin or other similar leather of the type used for shoe uppers. Preferably, the rough side of the leather is at the top.

A throttle valve 54 is disposed in the lower portion of outlet pipe 38 and is carried on a rockably mounted shaft 55 provided with an actuating lever 56. The throttle valve 54 is operable simultaneously with the carburetor throttle valve 25, as by means of a resilient wire link 57 connecting the throttle valve levers 27 and 56. The lower end of the link includes an extension rod 58 which is shiftable by an actuating member 59 to open and close the valves. The link is here shown to pass through a sectional tubular housing 60 extending vertically through the casing members of the economizer unit. The throttle valve 54 closes more completely than the carburetor throttle valve 25, the purpose of this arrangement being hereinafter described. In Fig. 1, the throttle valves are shown in intermediate positions by full lines, and in their open and closed positions by broken lines.

A combined suction and drain duct 61 extends downwardly from the lower portion of the drain chamber 52 and is connected to the upper end of a closed collecting tank or reservoir 62. The head space of the tank is placed under a vacuum which may be established in various ways. In the present instance, the tank head space is connected to one end of a duct 63, the other end 64 of which communicates with the interior of the economizer pipe 38 below the throttle valve 54, thus subjecting the duct to manifold suction. A check valve 65 is placed in the duct 63 and opens only when the manifold suction is relatively high, as during idling and light load conditions. The collecting tank is also placed under suction by a duct 66 connecting the head space of the tank with a vacuum-creating means, such as one of the engine cylinders with its clearance space 67, the duct 66 having a check valve 68 which is opened during the suction stroke. The duct 66 is here shown to be connected to an adapter 69 screwed in a spark plug opening 70 of the engine cylinder, the adapter also carrying a spark plug 71. In cases where the engine has an additional opening to the combustion chamber, the adapter may be omitted.

In some instances, the vacuum-creating means may be in the form of a separate vacuum pump of any conventional type, such as a vacuum booster pump 72 connected in the duct 63. By way of example, this pump may be of the diaphragm type commonly used for operating windshield wipers and other devices.

The material forming the diaphragm 48, while pervious to gasoline, is sufficiently dense to minimize passage of air and vapor therethrough. In order to cause gasoline collecting on the diaphragm to seep promptly therethrough into the drain chambers 52, it is found necessary to establish a suitable difference in absolute pressure between the spiral fuel passage 46 and the drain chamber. This differential pressure is obtained by subjecting the drain chamber 52 to a relatively high vacuum. During idling or light loads, the manifold suction is relatively high and is adequate for this purpose. Since the downstream throttle valve 54 closes more completely than the carburetor throttle valve 25, the absolute pressure in the spiral fuel passage will be somewhat higher than the absolute pressure in the drain chamber, thus providing the desired difference in pressure. At high speeds or heavy loads the manifold suction is low, but the requisite suction is then furnished by the auxiliary vacuum-creating means such as the cylinder connection 66 or the vacuum booster pump 72, or both.

The carburetor 23 is supplied with liquid fuel from a main fuel tank 73 through a feed pipe 74, as by means of a fuel pump 75. The collecting tank 62 is emptied at suitable intervals through a drain pipe 76 which is connected to the main fuel tank. If desired, the collecting tank may be placed in or form a part of the main fuel tank. Drainage of the collecting tank is controlled either manually by a manually operated valve 77, or automatically by an automatic discharge valve 78 such as of the float-operated trap type. A shut-off valve 79 is placed between the collecting tank and the automatic valve, permitting the collecting tank to be used as a reserve fuel tank under the control of the manually operated valve 77.

In the operation of the engine, a mixture of fuel and air is drawn downwardly from the carburetor 23 through the economizer and into the intake manifold under the influence of manifold suction. The fuel mixture or charge leaving the carburetor ordinarily contains a considerable quantity of liquid fuel in the form of suspended or entrained droplets, and this condition is particularly pronounced under starting, idling and accelerating conditions. The charge passes laterally through the chamber 43 and downwardly therefrom through the partition plate ports 49 into the outer end of the spiral passage or conduit 46, and then flows inwardly along the spiral passage to the central tube 47 from which it descends through the vertical pipe 38, past the throttle valve 54, and into the intake manifold 21. In its downward flow from the ports 49 the charge changes direction, causing some of the entrained liquid fuel to drop to the diaphragm, and during the flow of the charge through the spiral passage, fuel droplets collect on the walls 45 of the passage and on the pervious diaphragm. The centrifugal force on the swirling charge aids the deposit of fuel droplets on the side wall surfaces, and these droplets then drain onto the diaphragm. Liquid fuel is thus progressively separated from the charge, and the centrifugal force on the charge increases as it flows toward the inner end of the spiral passage where the radius of curvature decreases. Also, during the flow of the charge a portion of the liquid fuel in the charge will become vaporized. The liquid fuel deposited on the pervious diaphragm is drawn downwardly therethrough into the drain chamber 52 by the vacuum in this chamber, the absolute pressure in this chamber being lower than the absolute pressure in the spiral passage 46. The diaphragm becomes soaked with the liquid fuel, thus minimizing the passage of air and vapor through the diaphragm. The vacuum in the drain chamber is established through the duct 61 which causes the liquid fuel to drain through the duct into the collecting tank 62. Assuming the vacuum booster pump 72 to be absent, the suction applied to the drain chamber 52 and head space of the collecting tank 62 will be that of the intake manifold which is relatively high at idling and light loads, the check valve 65 being then open. At such times the lower throttle valve 54 will be nearly closed, whereas the carburetor throttle valve 25 will be more open, thus insuring a higher vacuum in the drain chamber than in the spiral passage. Also, at such times, a small amount of fuel vapor and air will be drawn into the manifold through the duct 63. At high speeds or heavy loads, the manifold suction drops, but the high vacuum desired is then established through the suction duct 66 by the cylinder suction, the check valve 68 opening during each suction stroke of the piston, and the manifold check valve 65 being closed. The suction duct 66 also functions at idling speeds, but during such speeds the manifold suction is more effective.

When a vacuum pump, such as the vacuum booster pump 72, is included in the system, the requisite vacuum for the economizer drain chamber can be provided under all conditions of engine speed and load, and the engine suction duct 66 may then be omitted, or may be used as an auxiliary or emergency vacuum connection.

The amount of liquid fuel accumulating in the collecting tank 62 over a given period will vary with engine operating conditions. In general, the fuel accretions will be greater during starting, idling and accelerating. When the engine is stopped, the vacuum in the drain chamber 52 and collecting tank 62 will persist for several seconds, thus insuring removal of liquid fuel from the economizer unit.

At suitable intervals the contents of the collecting tank are drained into the main fuel tank through the automatic discharge valve 78 or through the manually operated valve 77, the latter being opened when the engine is at rest and the vacuum in the collecting tank is broken.

The use of the economizer will improve the fuel mixture and minimize the presence of unvaporized or liquid fuel therein, resulting in substantial saving of fuel and insuring smooth running of the engine. Also, carbon formation and crank case dilution will be reduced to a minimum, and engine life will be lengthened. Carburetor adjustments are rendered less critical, since excess liquid fuel will be removed through the pervious diaphragm.

In the case of a supercharged engine where the fuel charge flowing through the spiral passage or conduit 46 is sufficiently above atmospheric pressure, the difference in pressure at opposite sides of the pervious diaphragm may be sufficient to cause the liquid fuel to be forced through the diaphragm without providing a vacuum in the drain chamber 52. However, even in a supercharged induction system, it is generally desirable to subject the drain chamber to a vacuum.

Instead of making the economizer unit as a separate device, it may be incorporated as a part of the induction system. Also, by providing frequent drain operations, the drain chamber 52 may also serve as a collecting tank, thus dispensing with the use of a separate collecting tank. However, it is generally desirable to avoid the presence of any considerable amount of liquid fuel near the engine.

While the economizer is here shown to be associated with a down-draft carburetor, the device may also be used with induction systems including up-draft and side-draft carburetors.

In the modified form of the invention shown in Figs. 5 and 6, 129 designates an economizer unit which is interposed between an engine intake manifold 121 and the down-draft carburetor 23, the manifold having a top inlet connection 122. The economizer unit comprises complementary upper and lower casing members 130 and 131 the adjacent marginal portions of which are rigidly secured together. The upper casing member, which may be in the form of a casting, is of generally cylindrical shape and has a top wall 142 with a central vertical opening 133 in a boss 134 to which the carburetor outlet flange 24 is rigidly secured as by studs 35, the opening 133 communicating with a central laterally opening tube 147 in the casing member. The bottom casing member includes a perforated diaphragm-supporting top plate 136 to which is secured the marginal portion of a conical downwardly converging bottom wall 137. A central vertical strut-forming tube 138 is connected between the top plate and the bottom member and has drain notches 139 at its lower end.

The top wall 142 of the upper casing member 130 has formed thereon or secured thereto at its bottom face a spirally extending band or rib 145 with spaced convolutions to form a spiral passage or conduit 146, the inner end of the passage communicating with the central tube 147, and the outer end terminating in a tangential discharge extension 143 on the casing member. The discharge extension has a downturned terminal elbow portion 144 with a horizontal outlet flange 140 which is secured to the manifold inlet connection 122, as by studs 141. The lower edge of the spiral band or rib extends in a horizontal plane and is close to and preferably in contact with the upper face of a porous or pervious diaphragm 148 which rests on the flat perforated plate 136. The diaphragm 148, which is generally similar to the diaphragm 48 of Fig. 1, thus forms the bottom wall of the spiral passage or conduit 146. This passage is of generally rectangular cross-sectional shape. However, the outer side wall 145' of the passage is here shown to slope downwardly, as seen in Fig. 5, for a purpose hereinafter described. The upper casing member has an outturned marginal bottom flange 150 which is rigidly attached to the marginal portion of the plate 136, as by screws 151, the marginal portion of the diaphragm being clamped and sealed between the casing flange and the plate.

A drain chamber 152 is formed between the conical bottom member 137 and the diaphragm-supporting plate 136, the latter plate having perforations 153 arranged spirally to register with the spiral passage 146, as in the device of Fig. 1. The drain chamber has a centrally connected drain duct 161 and is placed under a vacuum, as hereinafter described, for drawing liquid fuel downwardly through the diaphragm and discharging the liquid fuel from the chamber.

A throttle valve 154 is disposed in the discharge extension 143 and is carried on a shaft 155 provided with an actuating lever 156. The throttle valve 154 is operable simultaneously with the carburetor throttle valve 25, as by a link 157 which is connected to an arm of an actuating lever 127 mounted on an extension shaft 26' for the carburetor throttle valve, the extension shaft being supported on a suitable bearing bracket 158 attached to the casing member 130. As in the device of Fig. 1, the downstream throttle valve 154 closes more completely than the carburetor throttle valve. The lever 127 is here shown to include an operating arm 159.

The drain chamber 152 may be placed under a vacuum in any suitable manner and is here shown to have a drain duct 161 connected to a vacuum pump 172 having a discharge pipe 176 which extends into the main fuel tank 173. With this arrangement, the vacuum pump will discharge both air and fuel, the latter being mainly in liquid form. Any entrained fuel vapor will be condensed in the vented fuel tank.

In some instances, a branch suction pipe 163 has one end connected to the drain duct 161 and the other end 164 to the casing outlet elbow 144, and is provided with a check valve 165 and a manually operable shut-off valve 166, the latter being closed at will.

In the operation of the economizer of Figs. 5 and 6, the fuel charge passes downwardly from the carburetor into the central portion 147 of the casing member 130 and then passes outwardly along the spiral passage 146 and into the intake manifold. The swirling action of the charge will tend to urge downwardly along the sloping rib walls any liquid fuel particles collecting thereon. Liquid fuel deposited on the pervious diaphragm is drawn downwardly through the diaphragm, as in the device of Fig. 1.

In the device of Figs. 5 and 6, the distance from the carburetor outlet to the pervious diaphragm is somewhat shorter than that in the device of Fig. 1, and the elevation of the carburetor above the intake manifold inlet is also reduced.

It is also possible to adapt the economizer construction of Figs. 5 and 6 for use as an inflow device, in which event the carburetor would be connected to the tangential extension 143 and the intake manifold would be connected to communicate with the opening 133. The downstream throttle valve 155 would then be relocated at the opening 133.

Instead of using the vacuum means above described for draining the drain chamber 152, it is possible to employ the vacuum means shown in Fig. 1.

The modified form of fuel economizer shown in Figs. 7 to 9 includes an economizer unit 229 which is interposed between the carburetor 23 and the intake manifold 21 in the manner of the apparatus of Fig. 1. The economizer unit 229 comprises complementary upper and lower casing members 230 and 231 which are horizontally elongated and have their adjacent marginal portions secured together. The upper casing member has a top wall 232 with a middle opening 233 surrounded by a boss 234 to which the carburetor outlet flange 24 is secured, as by studs 35. The lower casing member 231 includes an elongated perforated diaphragm-supporting top plate 236 to which is secured a downwardly sloping bottom wall or shell 237 and a central vertical outlet pipe 238 coaxial with the top boss 233, the outlet pipe having a reduced shouldered upper end 239 rigidly attached to and extending through the plate 236, and having a lower end with an outlet flange 40 rigidly secured to the intake manifold inlet, as by studs 41. In this manner, the economizer unit and the carburetor are rigidly supported on the manifold, as in the device of Fig. 1.

An elongated horizontal baffle member 242 is secured within the upper casing member 230 to form therewith upper and lower passages 243 and 246 which communicate at their outer ends by way of openings 249. The inner ends of the upper passages 243 communicate with the inlet opening 233 of the upper casing member, and the inner ends of the lower passages 246 communicate with the upper end of the outlet pipe 238. The passages 243 and 246 thus define two divided paths of flow. Upper and lower deflectors 244 and 247 are provided at the middle portion of the baffle member 242, and in some instances vertical ribs 245 are formed longitudinally on the upper and lower faces of the baffle members. The lower edges of the lower vertical ribs 245 extend horizontally and are close to and preferably in contact with the upper surface of a porous or pervious diaphragm 248 which rests on the flat supporting plate 236. The diaphragm 248, which has the same characteristics as the diaphragm 48, thus forms the bottom wall of the passages 246, which are of generally rectangular shape in cross section. The diaphragm-supporting plate is provided with perforations 253 for the passage of liquid fuel. The upper casing member 230 has an outturned marginal bottom flange 250 which is rigidly attached to the marginal portion of the plate 236, as by screws 251, the marginal portion of the diaphragm being clamped and sealed between the casing flange and the plate. The central portion of the diaphragm is apertured to fit around the upper end 239 of the outlet pipe.

As in the device of Fig. 1, the carburetor and the economizer outlet pipe have respective throttle valves 25 and 54 which are connected for simultaneous operation, as by a link 257, the downstream throttle valve 54 closing more completely than the carburetor throttle valve. The extended lower end of the link 257 is shiftable by an actuating member 59 to open and close the valves.

The bottom member 237 has a drain duct 61 which communicates with a drain chamber 252 formed between the bottom member and the plate 236. The drain duct is placed under a suitable vacuum as in Fig. 1 or in Fig. 5. The outlet pipe 238 is here shown to have a vacuum connection 64, as in the device of Fig. 1.

In the operation of the device of Figs. 7 to 9, the charge flows downwardly from the carburetor 24 to the entrance portions of the upper passages 243 and there divides, flowing outwardly along these passages and then downwardly through the openings 249 to the diaphragm. The charge then flows inwardly along the lower passages 246 and downwardly into the outlet pipe 238 and the intake manifold inlet. Liquid fuel droplets and accumulations are removed from the charge during its flow in the casing passages and are drawn through the pervious diaphragm and drained off, as in the device of Fig. 1.

The horizontally elongated shape of the economizer unit of Figs. 7 to 9 permits mounting of the unit in restricted spaces, the width of the device being not much greater than the width of the carburetor.

The modified form of fuel economizer shown in Figs. 10 to 13 includes an economizer unit 329 which is interposed between a carburetor and an intake manifold. The economizer unit comprises complementary upper and lower casing members 330 and 331 which are horizontally elongated and have their adjacent marginal portions secured together. The unit is here shown to be applied to an engine having a dual downdraft carburetor 323 and a double or twin intake manifold 321, although with slight changes it may also be used with a single barrel carburetor. The carburetor has two discharge openings or barrels 323' with respective throttle valves 325 on a common shaft 326 provided with an actuating lever 327, and has a flanged discharge end 324 which is secured as by screws 335 to a boss 334 formed centrally on the elongated top wall 342 of the upper casing member, the boss having two inlet openings 333 registering with the carburetor outlet openings. Each carburetor section has the usual fuel jets including one or more idling jets 328, Fig. 12. The bottom casing member 331 has a vertical double outlet pipe 338 with two tubular passages 338' axially aligned with the carburetor outlet passages 323' and with twin passages 322 in the intake manifold, the lower end of the outlet pipe having a flange 340 which is secured to the intake manifold, as by screws 341. This arrangement of the economizer unit permits the unit and carburetor to be rigidly supported on the manifold.

The top wall of the casing member 330 has formed thereon or secured thereto at its lower face a pair of aligned vertical ribs 345 extending longitudinally of the casing member, the outer ends of the ribs being spaced from the ends of the casing member and each rib forming a U-shaped charge passage 346 with the opposite side walls and rounded end walls of the casing member. In some instances turning vanes 347 are provided at the outer ends of the passages, as best seen in Fig. 11, to smooth the charge flow and to present additional collecting surfaces for fuel droplets. The inlet ends of the two passages communicate with the respective inlet openings 333 in the bosses 334, and the outlet ends of the passages communicate with the upper ends of the respective tubular passages 338' in the outlet pipe 338.

The lower edge of the casing member 330 has an outturned marginal flange 350, and the outer edge of the bottom member and the upper end of the outlet member 338 are secured to a flat elongated diaphragm-supporting plate 336 provided with perforations 353. Interposed between the flange 350 and the plate and clamped thereto, as by bolts 351, is an elongated porous or pervious diaphragm 348 having the same characteristics as the diaphragm of the device of Fig. 1, the diaphragm forming the bottom wall of the casing passages 346.

The carburetor and outlet member throttle valves 325 and 354 are connected for simultaneous movement, as by a link 357, the downstream throttle valves closing more completely than the carburetor throttle valves. An actuating member 359 is connected to the throttle lever 355. The bottom member 337 has a drain duct 361 which communicates with a drain chamber 352 formed between the bottom member and the plate 348. The drain duct is placed under a suitable vacuum, as hereinbefore described.

In the operation of the device of Figs. 10 to 13, the fuel charge flows from each carburetor barrel into the entrance of the associated passage or conduit 346 and flows outwardly along the passage to the outer curved end thereof and then reversely along the rest of the passage and downwardly into the associated passages of the outlet pipe 338 and manifold 321. In its travel along the passages 346, liquid fuel in the charge is drawn through the pervious diaphragm 348. At the outer end of each passage 346 the charge flow is divided by the turning vane 347, which avoids excessive turbulence and presents an additional collecting surface for fuel droplets. Also, the centrifugal force on the charge at the curved portions of the passages will cause liquid fuel to deposit on the collecting surfaces. In its flow through the economizer some of the liquid fuel will become vaporized.

The limited width of the economizer unit permits the device to be installed in restricted spaces.

The modified form of fuel economizer shown in Figs. 14 and 15 includes an economizer unit 429 which is interposed between the down-draft carburetor 23 and the intake manifold 21 in the manner of the apparatus of Fig. 1. The economizer unit comprises complementary upper and lower casing members 430 and 431 which are horizontally elongated and have their adjacent marginal portions secured together, as in Figs. 10 and 11. The upper casing member has a top wall 442 with an intermediate opening 433 surrounded by a boss 434 to which the carburetor outlet flange is secured, as in Fig. 1. The lower casing member 431 includes an elongated perforated diaphragm-supporting plate 436 to which is secured a downwardly sloping bottom wall or shell 437 and a central vertical outlet pipe 438 similar to the pipe 238 of Fig. 7 but somewhat shorter, the upper end of the pipe being secured to the plate in axial alignment with the carburetor outlet, and the lower end of the pipe being flanged and rigidly secured to the intake manifold, as in the devices of Figs. 1 and 7.

The top wall 442 of the upper casing member has secured thereto at its lower face a central longitudinal rib 445, the outer ends of which are spaced from the ends of the casing member so as to form a loop-shaped charge passage or conduit 446 with the opposite side walls and rounded end walls of the casing member. The outer end portions of the passage have turning vanes 447, as in the device of Fig. 11. The inlet end of the passage 446 communicates with the inlet opening 433 in the boss 434, and the outlet end of the passage communicates with the upper end of the outlet pipe 438, as seen in Fig. 14.

The lower edges of the rib 445 and the turning vanes 447 extend in a horizontal plane and are close to and preferably in contact with the upper surface of a porous or pervious diaphragm 448 which rests on the perforated plate 436. The diaphragm, which has the same characteristics as the diaphragm 48 of Fig. 1, thus forms the bottom wall of the passage 446. The diaphragm is apertured to fit around the upper end of the outlet pipe.

As in the device of Fig. 1, the carburetor and economizer have respective throttle valves 25 and 54 which are connected for simultaneous operation, as by a link 457, the lower end of the link being shiftable by an actuating member 59.

The bottom member 437 has a drain duct 461 which communicates with a drain chamber 452 formed between the bottom member and the perforated plate 436. The drain duct is placed under a vacuum, as hereinbefore described. The outlet pipe 438 has a vacuum connection 464 as in the device of Fig. 1.

In the operation of the device of Figs. 14 and 15, the fuel charge flows downwardly from the carburetor 23 to the entrance portion of the loop-shaped passage or conduit 446 and flows around the passage, the charge being subjected to centrifugal force at the curved opposite end portions of the casing. The charge then flows downwardly into the outlet pipe 438 and intake manifold 21. The liquid fuel entrained in the charge is largely separated therefrom in its flow through the passage 446 and is drawn downwardly through the pervious diaphragm 448. Some of the liquid fuel in the charge will become vaporized in its travel through the passage.

What I claim as new and desire to secure by Letters Patent is:

1. In a fuel economizer for an internal combustion engine adapted to burn a charge of vaporized fuel and air and having an intake conduit and a carburetor, means forming a charge-conducting passage and a chamber with an outlet, said passage having an inlet adapted to communicate with the carburetor and having an outlet portion adapted to communicate with the intake conduit, a diaphragm pervious to the fuel in its liquid phase and forming a partition between said passage and said chamber, said diaphragm adapted to collect liquid fuel thereon from the charge at the passage side of the diaphragm, means for maintaining in said passage an absolute pressure higher than that in said chamber for effecting seepage of liquid fuel through said diaphragm from said passage to said chamber, and a throttle valve in the outlet portion of said passage and adapted when closed to restrict the effect of engine intake suction on said passage.

2. In a fuel economizer for an internal combustion engine adapted to burn a charge of vaporized fuel and air and having an intake conduit and a carburetor, means forming a charge-conducting passage and a chamber with an outlet portion, said passage having an inlet adapted to communicate with the carburetor and having an outlet adapted to communicate with the intake conduit, a diaphragm pervious to the fuel in its liquid phase and forming a partition between said passage and said chamber, said diaphragm adapted to collect liquid fuel thereon from the charge at the passage side of the diaphragm, means for maintaining in said passage an absolute pressure higher than that in said chamber for effecting seepage of liquid fuel through said diaphragm from said passage to said chamber, a throttle valve for the carburetor, and a second throttle valve in the outlet portion of said passage operatively connected with said carburetor throttle valve for simultaneously opening and closing said valves, said second throttle valve closing more fully than said carburetor throttle valve to restrict the effect of engine intake suction on said passage.

3. In a fuel economizer for an internal combustion engine adapted to burn a charge of vaporized fuel and air, casing means having a charge-conducting passage for the engine and further having a chamber with an outlet, said passage including a spiral portion, and said chamber extending below said spiral portion, a diaphragm pervious to the fuel in its liquid phase and forming a partition between the spiral portion of said passage and said chamber, said diaphragm forming the bottom wall of the spiral portion of said passage and adapted to collect liquid fuel thereon from the charge, and means for maintaining in the spiral portion of said passage an absolute pressure higher than that in said chamber for effecting downward seepage of liquid fuel through said diaphragm from said passage.

4. In a fuel economizer for an internal combustion engine adapted to burn a charge of vaporized fuel and air, casing means having a charge-conducting passage for the engine and further having a chamber with an outlet, said passage including an inflow spiral portion, and said chamber extending below said spiral portion, a diaphragm pervious to the fuel in its liquid phase and forming a partition between the spiral portion of said passage and said chamber, said diaphragm forming the bottom wall of the spiral portion of said passage and adapted to collect liquid fuel thereon from the charge, and means for maintaining in the spiral portion of said passage an absolute pressure higher than that in said chamber for effecting downward seepage of liquid fuel through said diaphragm from said passage.

5. In a fuel economizer for an internal combustion engine adapted to burn a charge of vaporized fuel and air, casing means forming a charge-conducting passage for the engine and further forming a chamber with an outlet, said casing means including an elongated laterally projecting portion forming therein a loop-shaped section of said passage, a diaphragm pervious to the fuel in its liquid phase and forming a partition between said chamber and said loop-shaped passage section, said diaphragm forming the bottom wall of said loop-shaped passage section and adapted to collect liquid fuel thereon from the charge, and means for maintaining in said loop-shaped passage section an absolute pressure higher than that in said chamber for effecting seepage of liquid fuel through said diaphragm from said passage to said chamber.

6. In a fuel economizer for an internal combustion engine adapted to burn a charge of vaporized fuel and air, a casing having complementary upper and lower casing members marginally secured together, said upper casing member having an inflow spiral passage and a top central charge inlet communicating with the outer end of said passage, said lower casing member having a perforated diaphragm-supporting top plate and a downwardly converging conical bottom member and a central vertical outlet pipe coaxial with said inlet and secured to said top plate and bottom member, the upper end of said outlet pipe communicating with the inner end of said spiral passage, there being a drain chamber between said top plate and bottom member and provided with an outlet, a diaphragm pervious to the fuel in its liquid phase and resting on said perforated top plate, said diaphragm forming the bottom wall of said spiral passage and adapted to collect liquid fuel thereon from the charge, and means for maintaining in said spiral passage an absolute pressure higher than that in said drain chamber for effecting seepage of liquid fuel through said diaphragm from said passage to said drain chamber.

7. In a fuel economizer for an internal combustion engine adapted to burn a charge of vaporized fuel and air, a casing having a charge-conducting passage for the engine and including complementary upper and lower casing members secured together, said passage having an inlet and an outlet and having a charge-conducting section in said upper casing member, said lower casing member having a perforated top plate and a bottom member, there being a chamber between said perforated top plate and said bottom member and provided with an outlet, a diaphragm pervious to the fuel in its liquid phase and resting on said perforated top plate, said diaphragm forming the bottom wall of said passage section and adapted to collect liquid fuel thereon from the charge, and means for maintaining in said passage an absolute pressure higher than that in said chamber for effecting seepage of liquid fuel through said diaphragm from said passage to said chamber.

8. In a fuel economizer for an internal combustion engine adapted to burn a charge of vaporized fuel and air, a casing having complementary upper and lower casing members marginally secured together, said upper casing member having a charge-conducting passage and an inlet and an outlet for said passage, said lower casing member having a perforated top plate and a bottom member, there being a drain chamber between said plate and bottom member and provided with an outlet, a diaphragm pervious to the fuel in its liquid phase and resting on said perforated top plate, said diaphragm forming the bottom wall of said passage and adapted to collect liquid fuel thereon from the charge, and means for maintaining in said charge-conducting passage an absolute pressure higher than that in said drain chamber for effecting seepage of liquid fuel through the diaphragm from said passage to said drain chamber.

EARL R. COX.

REFERENCES CITED

The following references are of record in the file of this patent:

UNITED STATES PATENTS

| Number | Name | Date |
| --- | --- | --- |
| 1,326,378 | Suau | Dec. 30, 1919 |
| 1,990,657 | Krieck | Feb. 12, 1935 |
| 2,057,165 | Schreurs | Oct. 13, 1936 |
| 2,098,391 | Irvin | Nov. 9, 1937 |
| 2,415,619 | Wichmann et al. | Feb. 11, 1947 |